US012807432B2

(12) United States Patent
Deleu et al.

(10) Patent No.: US 12,807,432 B2
(45) Date of Patent: Nov. 24, 2026

(54) STACKING ELEMENT FOR EXHIBITION STAND FRAMES

(71) Applicant: Aluvision N.V., Kortrijk (BE)

(72) Inventors: Dirk Urbain Deleu, Deinze (BE); Michiel Jacques Lesage, Deinze (BE)

(73) Assignee: ALUVISION N.V., Kortrijk (BE)

( * ) Notice: Subject to any disclaimer, the term of this patent is extended or adjusted under 35 U.S.C. 154(b) by 0 days.

(21) Appl. No.: 18/616,883

(22) Filed: Mar. 26, 2024

(65) Prior Publication Data

US 2024/0336445 A1 Oct. 10, 2024

(30) Foreign Application Priority Data

Apr. 6, 2023 (BE) .................................. 2023/5263

(51) Int. Cl.
*B65G 57/22* (2006.01)
*E04H 1/12* (2006.01)

(52) U.S. Cl.
CPC ........... *B65G 57/22* (2013.01); *E04H 1/1272* (2013.01)

(58) Field of Classification Search
CPC ........ B65D 19/44; B65D 57/00; B65D 57/22; B65D 59/08; B65D 81/05; B65D 81/053; B65D 85/48; B65D 85/86; B65D 85/62; B65D 5/006; B65D 21/02; F04H 1/1272; E04H 1/1272; E04B 2/74; B65G 57/03; B65G 57/22
USPC .......................................................... 211/194
See application file for complete search history.

(56) References Cited

U.S. PATENT DOCUMENTS 4,787,553 A * 11/1988 Hoskins ................. B65D 5/006 206/821
5,037,027 A * 8/1991 Nichols .................. B65D 5/006 206/512
5,531,326 A * 7/1996 Hummel ................ B65D 5/006 220/640
8,905,234 B2 * 12/2014 Yoshida ............... B65D 81/057 206/509

(Continued)

FOREIGN PATENT DOCUMENTS

DE 2804406 A1 * 6/1977 ............. B65D 21/02
DE 2652230 A1 * 8/1979 ............. B65D 21/02

(Continued)

OTHER PUBLICATIONS

Search Report in Belgium Application No. 2023/5263, dated Oct. 11, 2023, 6 pages.

*Primary Examiner* — Bryon P Gehman
(74) *Attorney, Agent, or Firm* — KDW Firm PLLC

(57) ABSTRACT

A stacking element includes, on a first surface, a first positioning element extending from the first surface in a first direction and, on a second surface, a second positioning element extending from the second surface in a second direction. One of the first and second positioning elements is provided to strike against an inner side of an upright edge of a frame of a first exhibition stand frame when the stacking element is arranged on the first exhibition stand frame of two or more exhibition stand frames. The other of the first positioning element and the second positioning element is provided to extend over the upright edge on an outer side of the upright edge of the frame of a second exhibition stand frame when the second exhibition stand frame is stacked on top of the first exhibition stand frame.

17 Claims, 7 Drawing Sheets

(56) References Cited

U.S. PATENT DOCUMENTS

| | | | | |
|---|---|---|---|---|
| 2014/0367305 | A1* | 12/2014 | Mizuo | B65D 19/44<br>206/585 |
| 2023/0234792 | A1* | 7/2023 | Van Boekel | B65G 57/22<br>414/802 |
| 2024/0208712 | A1* | 6/2024 | Schulte | B65D 81/133 |

FOREIGN PATENT DOCUMENTS

| | | | |
|---|---|---|---|
| DE | 3701293 | A1 | 4/1988 |
| JP | 5914229 | B2 | 5/2016 |
| WO | 2021/242098 | A1 | 12/2021 |

* cited by examiner

STACKING ELEMENT FOR EXHIBITION STAND FRAMES

CROSS-REFERENCE TO RELATED APPLICATIONS

This application claims priority to pending Belgian patent application serial number 2023/5263, filed Apr. 6, 2023, the entirety of which application is incorporated by reference herein.

FIELD OF THE INVENTION

The invention relates to a stacking element configured to be arranged between two or more exhibition stand frames.

BACKGROUND

Exhibition stand frames are used in constructions, also referred to as stands, such as exhibition stands, advertising structures, or structures used in the entertainment industry, for instance stages.

Exhibition stand frames are formed by at least four profiles which together form a frame defining an exhibition stand panel plane, wherein the at least four profiles have a side wall which is bounded by an edge standing upright relative to the exhibition stand panel plane.

Exhibition stand frames can be reused and are regularly transported from one event to another event. Stand builders, i.e. persons constructing the stands, here typically stack one exhibition stand frame on the other. In other words, one exhibition stand frame is placed on top of another exhibition stand frame.

The exhibition stand frames tend to slide off each other during stacking. One or more exhibition stand frames are often also damaged, for instance by one exhibition stand frame bumping into another exhibition stand frame.

SUMMARY OF THE INVENTION

Embodiments of the invention have the object of simplifying the stacking of exhibition stand frames and to prevent damage during stacking and during transport.

According to a first aspect, a stacking element is provided which is configured to be arranged between two or more exhibition stand frames for the purpose of facilitating stacking of the two or more exhibition stand frames. The exhibition stand frames are formed by at least four profiles, these together forming a frame which defines an exhibition stand panel plane. The exhibition stand panel plane can for instance comprise a cloth or plate comprising for instance a drawing printed thereon. The at least four profiles have a side wall which is bounded by an edge standing upright relative to the exhibition stand panel plane.

The stacking element comprises a base with a first surface and a second surface lying opposite thereto. The stacking element comprises on the first surface a first positioning element which extends from the first surface in a first direction. On the second surface the stacking element comprises a second positioning element which extends from the second surface in a second direction. One of the first positioning element and the second positioning element is provided to strike or lie against an inner side of the upright edge of the frame of the first exhibition stand frame when the stacking element is arranged on a first exhibition stand frame of the two or more exhibition stand frames. The first positioning element can thus for instance be provided to strike against the upright edge on an inner side of the upright edge. The other of the first positioning element and the second positioning element is provided here to extend over the upright edge on an outer side of the upright edge of the frame of the first exhibition stand frame when a second exhibition stand frame of the two or more exhibition stand frames is stacked on top of the first exhibition stand frame. In the example wherein the first positioning element is provided to lie on the inner side of the frame the second positioning element will be provided to lie on the outer side of the frame of the second exhibition stand frame. The advantage hereof is that placing of the stacking element is extremely simple because one of the positioning elements, according to the above example the first positioning element, lies on an inner side of the edge and the other positioning element lies on an outer side of the edge. The positioning element lying on the inner side strikes against the edge when the stacking element is being placed and is prevented from further movement by the edge. In this way the stacking element can be positioned relative to the exhibition stand frame in simple manner. The stacking element further has the advantage that, once the stacking element has been placed on the first exhibition stand frame, the other positioning element, which is located on the outer side relative to the frame, in turn forms a stop against which the second exhibition stand frame can strike. The movement of the second exhibition stand frame which is stacked on top of the first exhibition stand frame will be stopped in that the second exhibition stand frame is stopped by the positioning element which is provided to lie against an outer side of the second exhibition stand frame. The stacking element can therefore be positioned relative to the first exhibition stand frame in simple manner and further allows the second exhibition stand frame to be stacked on the first exhibition stand frame in simple manner.

Preferably, the base is at least triangular, as seen in a direction perpendicularly of one of the first and the second surface, and the first positioning element and the second positioning element lie substantially parallel to one of the sides of the at least triangular base. The triangular base allows the stacking element to be arranged at least at the position of a corner of the exhibition stand frame. In this way the freedom of movement of the stacking element is reduced further. More specifically, in this way the positioning element will lie at least against a first peripheral edge of the exhibition stand frame. A movement in a direction of movement oriented transversely relative to the first peripheral edge will further also be prevented at the position of the corner of the exhibition stand frame. This allows the stacking element to be arranged on the exhibition stand frame in simpler manner, as well as allowing the plurality of exhibition stand frames to be stacked on top of each other in more robust manner.

More preferably, the at least triangular base takes the form of a right triangle and the first positioning element and the second positioning element are provided close to one of the right angle sides of the base. The first positioning element preferably lies adjacently of one of the angle sides and extends over at least a portion of the length of the angle side.

The first positioning element preferably comprises a first positioning element portion and a second positioning element portion which are provided adjacently of respectively a first angle side and a second angle side connecting thereto. In this way the stacking element can be mounted on the exhibition stand frame at the position of a corner in improved manner.

The stacking element preferably comprises at least one third positioning element which extends from the first surface in the first direction, wherein the third positioning element extends parallel to the first positioning element and is located at a distance from the first positioning element. In this way the first positioning element and the third positioning element form at least partially a channel, wherein the first positioning element and the third positioning element form channel walls. This allows the upright edge to be received in the channel, thus limiting the freedom of movement of the stacking element further. The at least one third positioning element can be parallel to the first positioning element portion or the second positioning element portion of the first positioning element. More preferably, the stacking element comprises at least two third positioning elements extending parallel to respectively the first positioning element portion and the second positioning element portion. This allows the two upright edges intersecting at the position of a corner of the exhibition stand frame to be accommodated in a channel formed by respectively a first positioning element portion and one of the at least two third positioning elements. In this way the stacking element can only be removed in a substantially upright direction of the exhibition stand frame, and the freedom of movement of the stacking element is limited in almost every other direction of movement.

A first recess is preferably provided between the first positioning element portion and the second positioning element portion, which first recess is provided at the position of an intersection between the two connecting angle sides. In this way space is on one hand created which allows the corner of the exhibition stand profile to be accommodated at least partially. The created space allows tolerances in the manufacturing process of the exhibition stand frames to be accommodated, which further simplifies arranging of the stacking element. More preferably, a second recess is provided between the two third positioning elements and the second recess is aligned with the first recess. The first recess, and preferably the second recess, further preferably has a dimension greater than a width of an upright edge of an exhibition stand profile, preferably at least two times greater than a width of an upright edge of one exhibition stand profile. This allows the stacking element to be arranged on two mutually adjacent exhibition stand frames.

The stacking element preferably further comprises a fourth positioning element extending from the first surface in the first direction, wherein the fourth positioning element lies adjacently of and parallel to a third angle side between the first angle side and the second angle side. The fourth positioning element is further preferably provided with a third recess which is aligned with the first recess.

Preferably, the second positioning element is provided at a distance from one of the angle sides and the second positioning element extends over at least a portion of the length of the respective angle side. The distance between the angle side and the second positioning element further preferably substantially corresponds with a width of the upright edge of the exhibition stand profile.

The third positioning element preferably comprises a first positioning element portion and a second positioning element portion which are provided on respectively a first angle side and a second angle side of the base connecting thereto.

A fourth recess is further preferably provided between the first positioning element portion of the third positioning element and the second positioning element portion of the third positioning element, which fourth recess is provided at the position of an intersection between the two connecting angle sides.

The stacking element preferably further comprises a fifth positioning element extending from the second surface in the second direction, wherein the fifth positioning element lies parallel to and at a distance from a third angle side, between the first angle side and the second angle side.

The fifth positioning element is further preferably provided with a fifth recess which is aligned with the fourth recess.

The stacking element is preferably integrally formed.

BRIEF DESCRIPTION OF THE FIGURES

The above stated and other advantageous features and objects of the invention will become more apparent, and the invention better understood, on the basis of the following detailed description when read in combination with the accompanying drawings, in which.

DETAILED EMBODIMENTS

Figure 1:
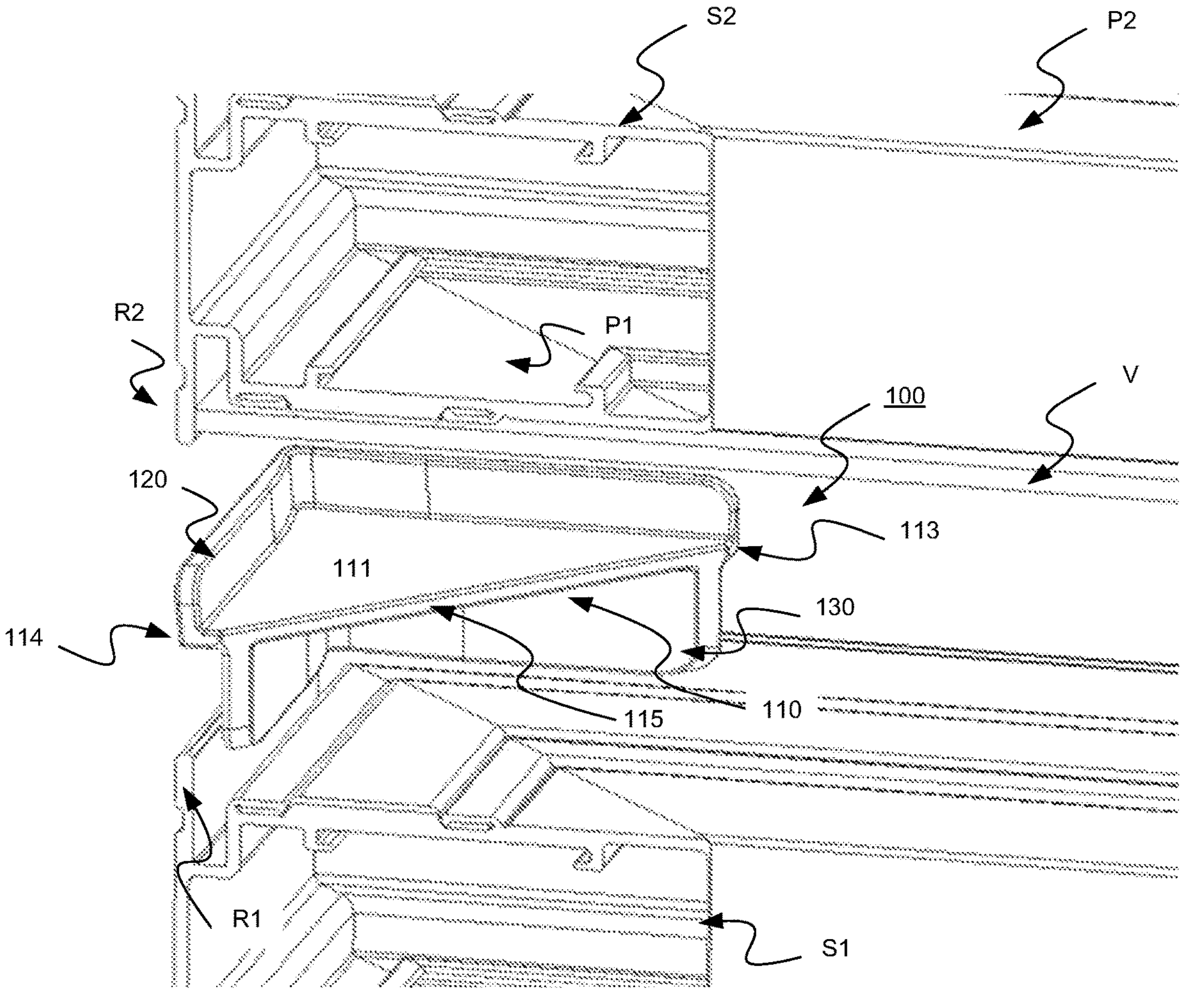
FIG. 1 is a perspective view of a stacking element according to an exemplary embodiment which is arranged between two exhibition stand frames.

The following detailed description relates to determined specific embodiments. The teaching hereof can however be applied in different ways.

The present invention will be described with reference to specific embodiments. The invention is however not limited thereto, but solely by the claims.

As used here, the singular forms "a" and "the" comprise both the singular and plural references, unless clearly indicated otherwise by the context.

The terms "comprising", "comprises" and "composed of" as used here are synonymous with "including". The terms "comprising", "comprises" and "composed of" when referring to stated components, elements or method steps also comprise embodiments which "consist of" the components, elements or method steps.

The terms first, second, third and so on are further used in the description and in the claims to distinguish between similar elements and not necessarily to describe a sequential or chronological order, unless this is specified. It will be apparent that the thus used terms are mutually interchangeable under appropriate circumstances and that the embodiments of the invention described here can operate in an order other than described or illustrated here.

Reference in this specification to "one embodiment", "an embodiment", "some aspects", "an aspect" or "one aspect" means that a determined feature, structure or characteristic described with reference to the embodiment or aspect is included in at least one embodiment of the present invention. The manifestations of the sentences "in one embodiment", "in an embodiment", "some aspects", "an aspect" or "one aspect" in different places in this specification thus do not necessarily all refer to the same embodiment or aspects. As will be apparent to a skilled person in this field, the specific features, structures or characteristics can further be combined in any suitable manner in one or more embodiments or aspects. Although some embodiments or aspects described here comprise some but no other features which are included in other embodiments or aspects, combinations of features of different embodiments or aspects are further intended to fall within the context of the invention and to form different embodiments or aspects, as would be apparent to the skilled person. In the appended claims all features of the claimed embodiments or aspects can for instance be used in any combination.

The same or similar elements are designated in the drawings with the same reference numerals.

FIG. 1 shows a perspective view of a stacking element 100 according to an exemplary embodiment. Stacking element 100 is configured to be arranged between two exhibition stand frames S1, S2. In the figure exhibition stand frame S2 is stacked on top of exhibition stand frame S1.

The exhibition stand frames S1, S2 are formed by at least four profiles, of which a first profile P1 is shown in cross-section and a second profile P2 is shown in lying position. The four profiles together form a frame, for instance a rectangular frame bounded by the four profiles. The frame defines an exhibition stand panel plane V. In FIG. 1 the exhibition stand panel plane V is filled at least partially by a cloth or panel on which a print or advertising message can be displayed. The at least four profiles have a side wall which is bounded by an edge R1, R2 standing upright relative to the exhibition stand panel plane.

The stacking element 100 is provided in order to facilitate arranging of one exhibition stand frame S2 on the other exhibition stand frame S1. The stacking element 100 comprises a base 110 with a first surface 111 and a second surface lying opposite thereto. In the view shown in FIG. 1 only the first surface 111 is visible. The second surface is visible and designated with reference numeral 112 in FIG. 2. The first surface 111 is also referred to as the upper surface. The second surface is also referred to as the lower surface. Stacking element 100 is shown in its most practical orientation in FIG. 1, i.e. with the first surface 111 facing upward. It is however also possible to reverse stacking element 100 and orient it with the first surface 111 downward.

Stacking element 100 comprises on first surface 111 a first positioning element 120 which extends from first surface 111 in a first direction. In the figure the first direction is an upward direction. Stacking element 100 further comprises on the second surface a second positioning element 130 which extends from the second surface in a second direction. In the figure the second direction is a downward direction. In order to facilitate stacking at least one of the first positioning element 120 and the second positioning element 130 is provided to strike against an inner side of upright edge R1 of the frame of the first exhibition stand frame S1, and the other of the first positioning element 120 and the second positioning element 130 is provided to extend over the upright edge on an outer side of upright edge R2 of the frame of the second exhibition stand frame. In the exemplary embodiment shown in FIG. 1 the first positioning element 120 is provided to extend over the upright edge R2 on an outer side of upright edge R2 of the frame of the second exhibition stand frame S2 and the second positioning element 130 is provided to strike against an inner side of upright edge R1 of the frame of the first exhibition stand frame S1. The advantage hereof is that placing of the stacking element 100 is extremely simple because one of the positioning elements 120, 130, according to the above example the second positioning element 130, lies on an inner side of the edge R1 and the other positioning element 120 lies on an outer side of the edge. The positioning element 130 lying on the inner side strikes against the edge when stacking element 100 is placed against the exhibition stand frame and is prevented from further movement by the edge. In this way stacking element 100 can be positioned relative to exhibition stand frame S1 in simple manner. Stacking element 100 further has the advantage that, once stacking element 100 has been placed on the first exhibition stand frame S1, the other positioning element which is situated on the outer side relative to the frame in turn forms a stop against which the second exhibition stand frame S2 can strike. The movement of the second exhibition stand frame S2 which is stacked on the first exhibition stand frame S1 will be stopped by the positioning element 120 which is provided to lie against an outer side of the second exhibition stand frame S2. Stacking element 100 can therefore be positioned relative to the first exhibition stand frame in simple manner and further allows the second exhibition stand frame to be stacked on the first exhibition stand frame in simple manner.

Figure 6:
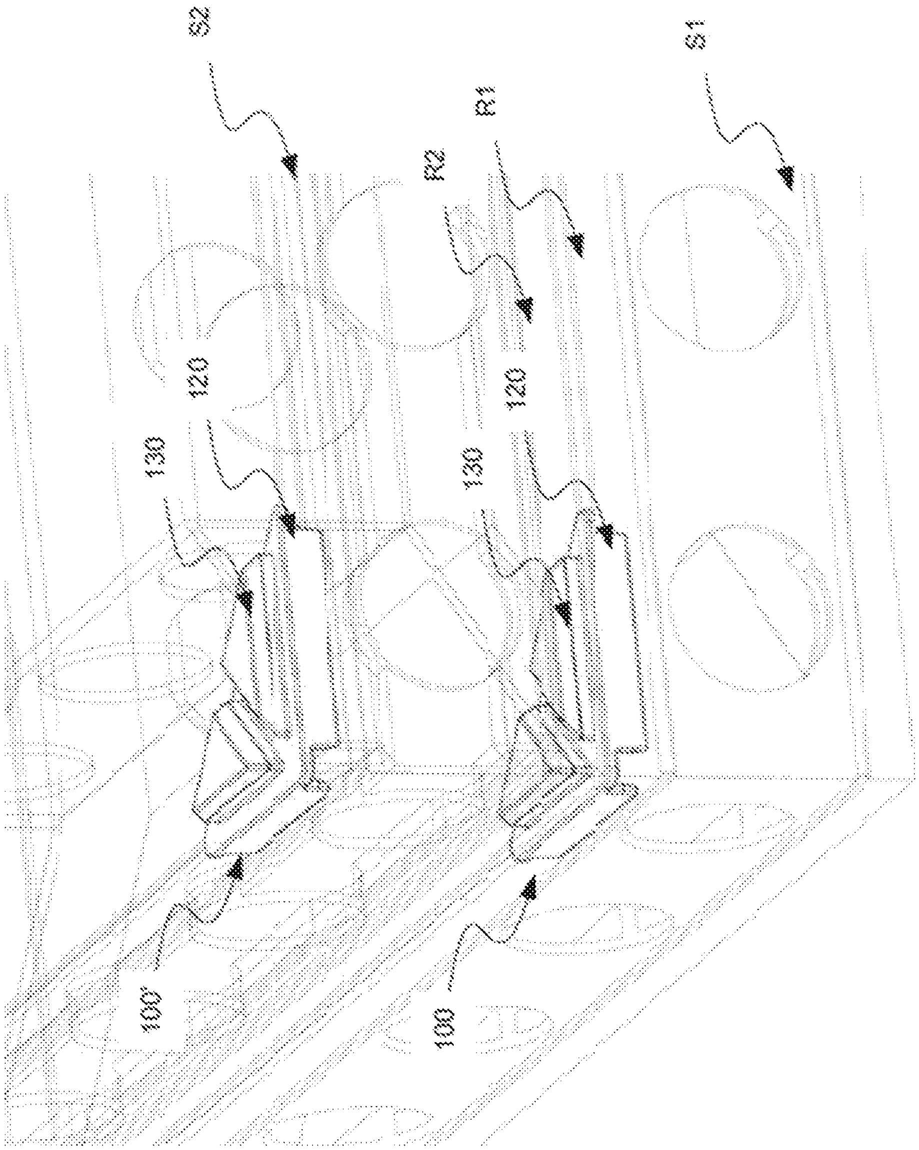
FIG. 6 is a perspective view wherein two exhibition stand frames are stacked on top of each other using a stacking element according to an exemplary embodiment.

It is noted that, as shown in FIG. 6, the first positioning element 120 can also be provided to extend over upright edge R1 on an outer side of upright edge R1 of the frame of the first exhibition stand frame S1. The second positioning element 130 is provided here to strike against an inner side of upright edge R2 of the frame of the second exhibition stand frame S2.

FIG. 1 further shows that the base 110, as seen in a direction perpendicularly of one of the first and the second surface, is at least triangular. The base 110 can particularly be triangular with a right angle. The base can also be rectangular or even square. Such exemplary embodiments however have the drawback that a large part of the base remains unused. Such exemplary embodiments are typically more expensive to produce and are therefore less preferable.

FIG. 1 further shows that the first positioning element 120 and the second positioning element 130 lie substantially parallel to one of the sides 113, 114, 115 of the at least triangular base. An exemplary embodiment wherein the first positioning element 120 only lies parallel to one angle side is not shown. The figure shows an exemplary embodiment wherein the first positioning element 120 and the second positioning element 130 lie adjacently of the two connecting angle sides 113, 114. The first positioning element 120 has here a positioning element portion lying parallel to the first angle side 113 and a second positioning element portion lying parallel to the second angle side 114. Such an exemplary embodiment will be discussed at length below. In the exemplary embodiment shown in FIG. 1 the angle between the first angle side 113 and the second angle side 114 is a right angle.

The stacking element 100 shown in FIG. 1 comprises a first positioning element 120 which extends along the whole first angle side 113 and second angle side 114. In this way an upright edge is formed along the whole right angle side. In FIG. 1 the first and a second positioning element portion are connected to each other at the position of the intersection of the first angle side 113 and the second angle side 114 so that they form one positioning element. Just as the first positioning element, the second positioning element 130 extends parallel to the first angle side 113 and the second angle side 114. The second positioning element 130 is however provided at a distance from the first angle side 113 and the second angle side 114.

In contrast to the exemplary embodiments shown in FIGS. 2, 3, 4 and 5, no positioning element is provided parallel to the third angle side 115 in the exemplary embodiment shown in FIG. 1. This allows the cloth or the plate forming the exhibition stand panel plane V to remain mounted on the second exhibition stand frame so that less disassembly is required.

Figure 2:
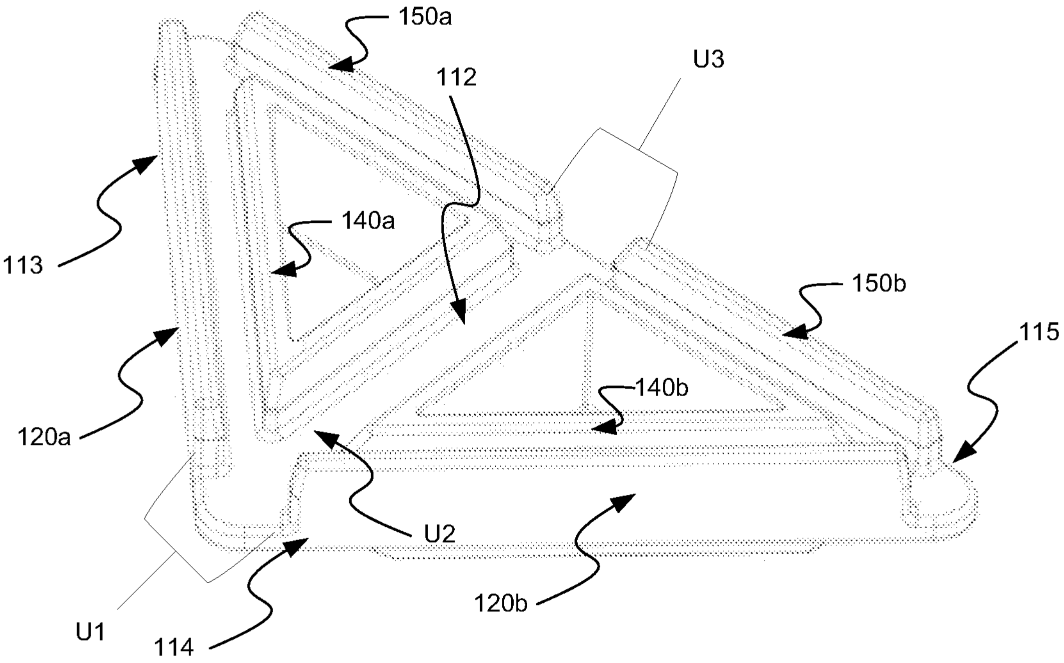
FIG. 2 is a perspective view as seen from above of a stacking element according to a further exemplary embodiment.
Figure 3:
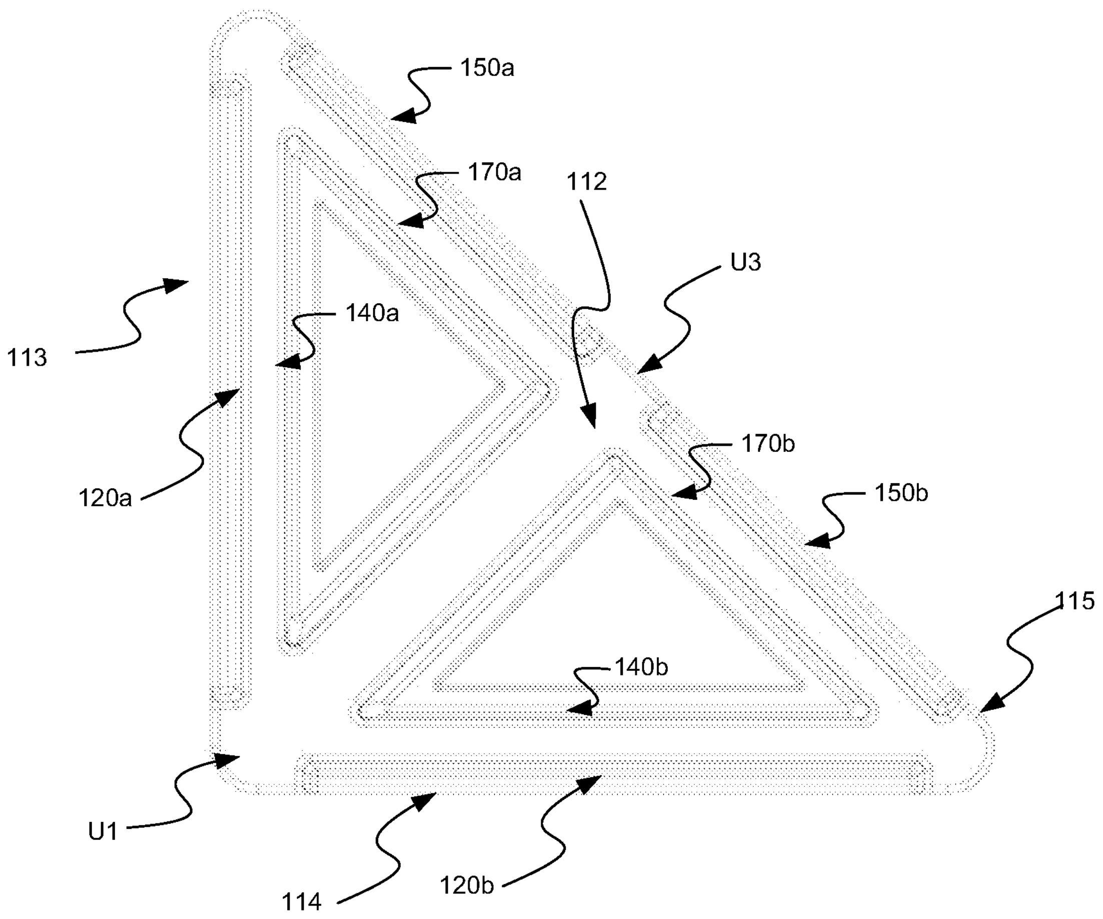
FIG. 3 is a top view of the exemplary embodiment shown in FIG. 2.

FIG. 2 shows a perspective view of the second surface of the base of a stacking element 100 according to a further exemplary embodiment. FIG. 3 shows the exemplary embodiment shown in FIG. 2 in a view perpendicularly of the second surface 112. The elucidation below therefore applies to both FIG. 2 and FIG. 3. In the shown exemplary embodiment the first positioning element 120 is provided to extend over the upright edge on an outer side of upright edge of the frame of the exhibition stand frame. As shown in FIGS. 2, 3, 4, 5, 6 and 7, the first positioning element 120 can also extend from the second surface of the base.

In the shown exemplary embodiment the first positioning element 120 comprises a first positioning element portion 120*a* and a second positioning element portion 120*b*. The first positioning element portion 120*a* lies adjacently of the first angle side 113 of the base. The second positioning element portion 120*b* lies adjacently of a second angle side 114 connecting to the first angle side 113.

Figure 7:
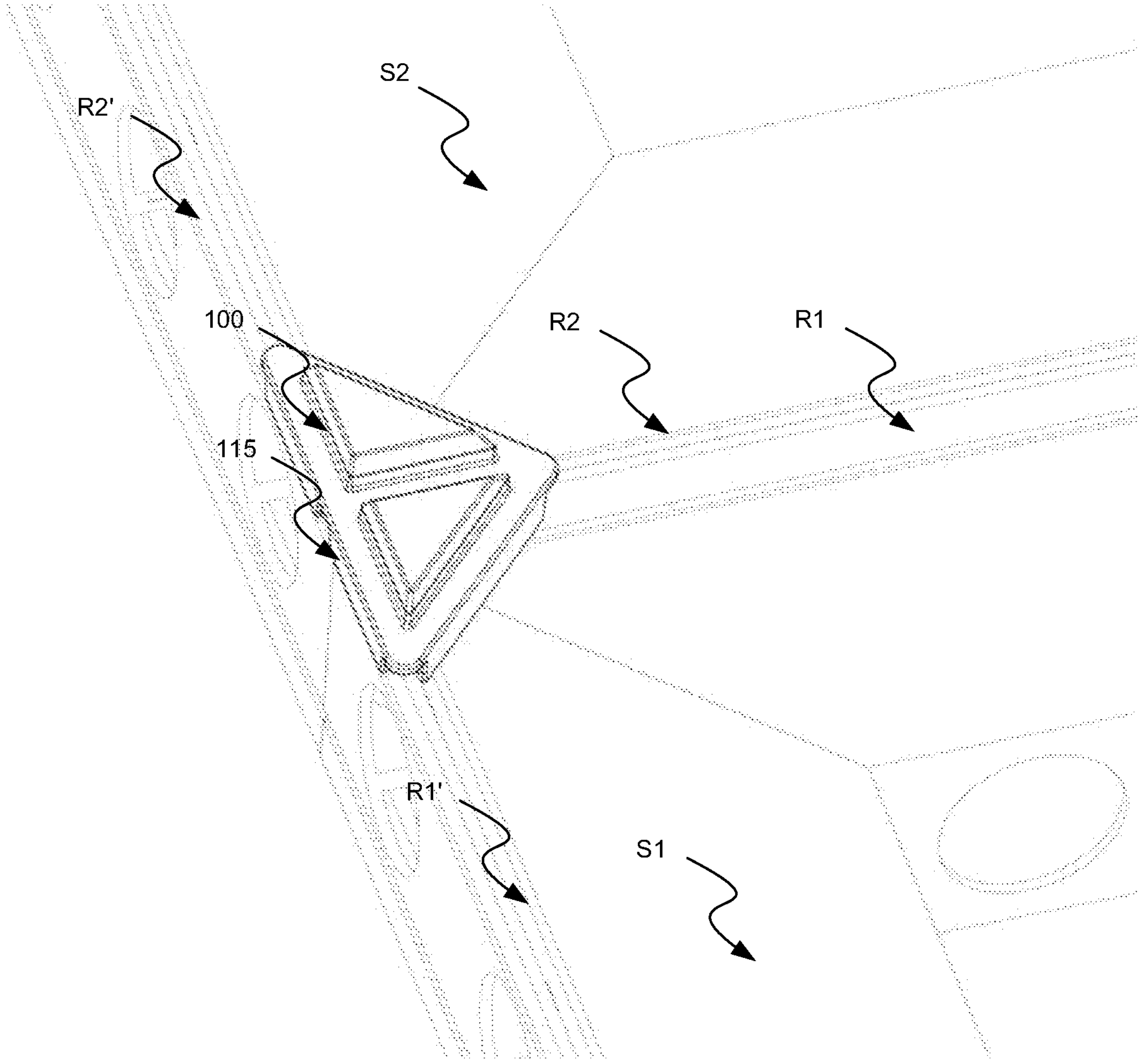
FIG. 7 is a perspective view wherein a stacking element according to an exemplary embodiment is used with two mutually adjacent exhibition stand frames.

A first recess U1 can be provided between the first positioning element portion 120*a* and the second positioning element portion 120*b* of the first positioning element 120. The first recess U1 is provided at the position of an intersection of the two connecting angle sides 113, 114. In this way space which allows the corner of the exhibition stand profile to be accommodated at least partially is on one hand created. The created space allows tolerances in the manufacturing process of the exhibition stand frames to be accommodated, which further simplifies arranging of the stacking element 100. This also allows the stacking element 100, as shown in FIG. 7, to be arranged over two edges R1 and R2 of mutually adjacent exhibition stand frames S1, S2. More specifically, as shown in FIG. 7, stacking element 100 can be arranged so that the third angle side 115 extends in line with the one exhibition stand frame S1 toward the second exhibition stand frame S2. The recess U1 allows stacking element 100 to be arranged over the two upright edges R1, R2 of the two exhibition stand frames S1, S2 lying against each other. In this exemplary embodiment the third angle side 115 will lie in line with the upright edges R1', R2' lying in line with each other. Furthermore, as will be further elucidated, when the first positioning element portion 120*a* and the second positioning element portion 120*b* of the first positioning element 120 is used in combination with a fourth positioning element 150, the stacking element can also function as protection when it is arranged over two exhibition stand frames S1, S2.

As shown in FIGS. 2 and 3, stacking element 100 can further comprise at least one third positioning element 140 which extends from the first surface in the first direction. The at least one third positioning element extends parallel to the first positioning element and is located at a distance from the first positioning element. In the shown exemplary embodiment the first positioning element comprises a first positioning element portion 120*a* and a second positioning element portion 120*b*. In the shown exemplary embodiment the third positioning element 140 comprises a first positioning element portion 140*a* and a second positioning element portion 140*b*. The first positioning element portion 140*a* and the second positioning element portion 140*b* of the third positioning element 140 can also be deemed two third positioning elements. The at least one third positioning element lies parallel to the first positioning element 120. FIGS. 2 and 3 show an exemplary embodiment wherein the first positioning element portion 140*a* and the second positioning element portion 140*b* of the third positioning element 140 lie parallel to respectively the first positioning element portion 120*a* and the second positioning element portion 120*b* of the first positioning element 120. In this way the first positioning element 120 and the third positioning element 140 form at least partially a channel, wherein the first positioning element and the third positioning element form channel walls. This allows the upright edge to be received in the channel, thus limiting the freedom of movement of the stacking element further. Furthermore, a second recess U2 can be provided between the two third positioning element portions 140*a*, 140*b*, and the second recess is aligned with the first recess U1. Although not visible in FIG. 7, recess U2 allows stacking element 100 to be arranged over the two upright edges R1, R2 of the two exhibition stand frames S1, S2 lying against each other.

The first recess U1, and preferably the second recess U2, have a dimension greater than a width of the upright edge of an exhibition stand profile, preferably at least two times greater than a width of an upright edge of one exhibition stand profile.

FIGS. 2 and 3 further show that stacking element 100 can comprise a fourth positioning element 150*a*, 150*b*. A plurality of fourth positioning elements can also be provided, for instance a first fourth positioning element 150*a* and a second fourth positioning element 150*b*. The fourth positioning element 150*a*, 150*b* extends from the first surface in the first direction. The fourth positioning element lies adjacently of and parallel to the third angle side 115. The fourth positioning element 150*a*, 150*b* can be arranged over one or more edges of an exhibition stand frame, for instance the edges R1', R2' lying mutually in line, as shown in FIG. 7. The fourth positioning element 150*a*, 150*b* protects the profiles of the exhibition stand frames in this way.

When the fourth positioning element 150*a*, 150*b* is provided with a third recess U3 which is aligned with the first recess U1, the stacking element can be provided with two mutually adjacent exhibition stand frames at the position of the corner points. In this way the stacking element is thus usable at the position of one corner of one exhibition stand frame, as well as when two mutually adjacent exhibition stand frames overlap.

FIGS. 2 and 3 further show that a sixth positioning element 170, 170*a*, 170*b* can be provided. The sixth positioning element 170, 170*a*, 170*b* lies parallel to and at a distance from the fourth positioning element 150*a*, 150*b*. In the figures two sixth positioning elements 170*a*, 170*b* are shown, which two sixth positioning elements 170*a*, 170*b* can also be deemed positioning element portions of one positioning element. The first positioning element portion 170*a* and the second positioning element portion 170*b* of the sixth positioning element 170 lie parallel to respectively the first positioning element portion 150*a* and the second positioning element portion 150*b* of the fourth positioning element 150. In this way the fourth positioning element 150 and the sixth positioning element 170 form at least partially a channel. This allows the upright edge to be received in the channel, thus limiting the freedom of movement of the stacking element further. In this way the channel can further also receive two edges R1', R2' lying mutually in line so that the stacking element of one exhibition stand frame overlaps the second exhibition stand frame S2 lying adjacently thereof, as shown in FIG. 7.

Figure 4:
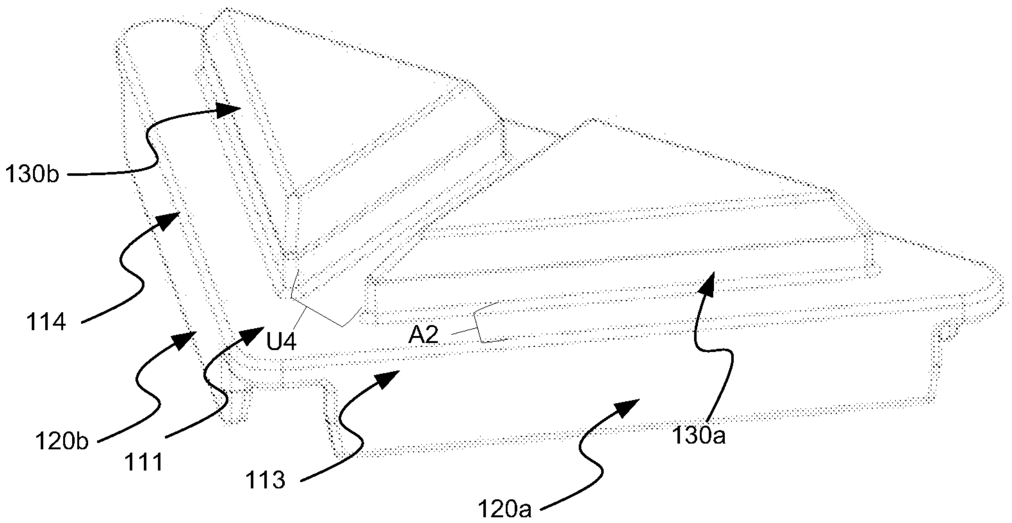
FIG. 4 is a perspective view as seen from below of a stacking element according to an exemplary embodiment.
Figure 5:
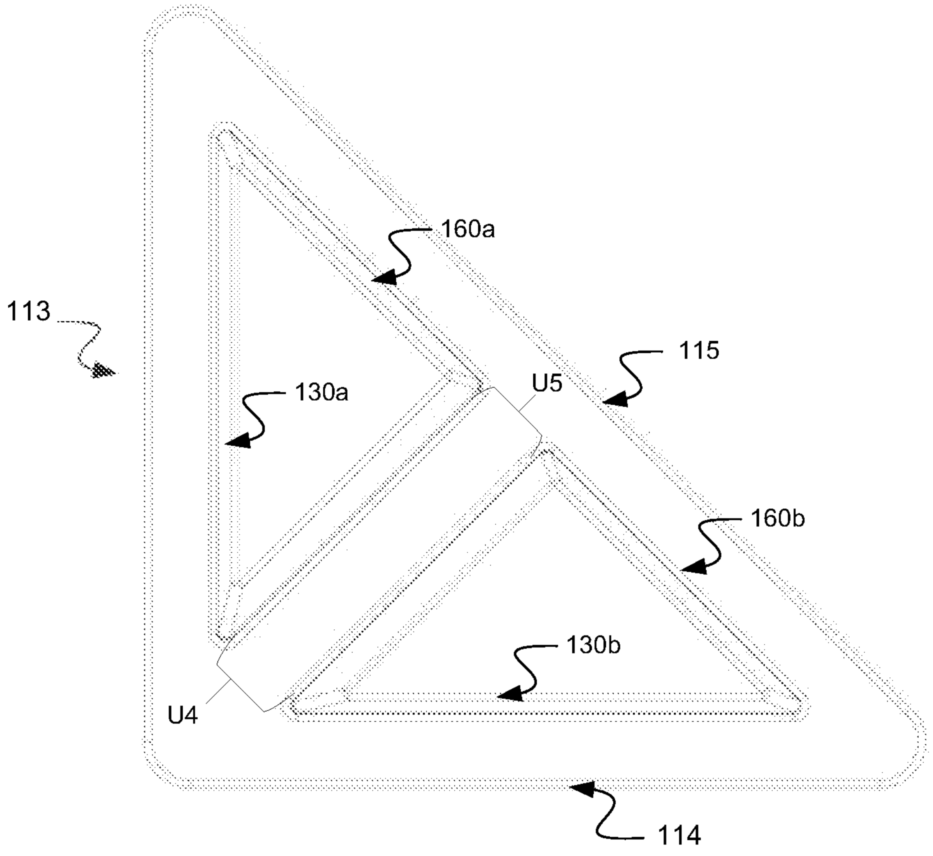
FIG. 5 is a top view of the exemplary embodiment shown in FIG. 2.

FIG. 4 shows a perspective view of the first surface of the stacking element according to an exemplary embodiment. FIG. 5 shows the exemplary embodiment shown in FIG. 4 in a view perpendicularly of the first surface 11. The elucidation below therefore applies to both FIG. 4 and FIG. 5.

FIGS. 4 and 5 show that the second positioning element 130 is provided at a distance A2 from one of the angle sides 113, 114 and extends over at least a portion of the length of the respective angle side. The distance between the angle side 113, 114 and the second positioning element substantially corresponds with a width of the upright edge of the exhibition stand profile. This allows the upright edges to be clamped indirectly between the second positioning element 130 and the first positioning element 120.

The second positioning element 130 can comprise a first positioning element portion 130*a* and a second positioning element portion 130*b* which are provided on respectively a first angle side 113 and a second angle side 114 of the base connecting thereto.

A fourth recess U4 can be provided between the first positioning element portion of the second positioning element 130 and the second positioning element portion of the second positioning element 130. The fourth recess U4 is provided at the position of an intersection between the two connecting angle sides 113, 114. The fourth recess functions as channel for receiving two edges of two exhibition stand frames. This allows two edges of two further exhibition stand frames to be arranged in the fourth recess. More specifically, two further exhibition stand frames can be arranged on the exhibition stand frames S1, S2 lying adjacently of each other in FIG. 7.

The stacking element can further also comprise a fifth positioning element 160*a*, 160*b* which extends from the second surface in the second direction, wherein the fifth positioning element 160*a*, 160*b* lies parallel to and at a distance from a third angle side 115. The fifth positioning element 160*a*, 160*b* can be provided with a fifth recess U5 which is aligned with the fourth recess U4.

FIG. 6 shows a perspective view wherein two exhibition stand frames S1, S2 are stacked on top of each other using a stacking element 100 according to an exemplary embodiment. FIG. 6 more specifically shows that a first stacking element 100 is arranged at the position of a corner of a first exhibition stand frame S1. The stacking element 100 corresponds with the exemplary embodiments shown in FIGS. 2, 3, 4, 5.

Stacking element 100 is directed with the second surface toward the first exhibition stand frame S1 and is provided with a first positioning element 120 provided to extend over the upright edge R1 on an outer side of the upright edge R1 of the frame of the first exhibition stand frame S1, and the second positioning element 130 is provided to strike against an inner side of the upright edge R2 of the frame of the second exhibition stand frame S2. The advantage hereof is that placing of stacking element 100 is extremely simple because one of the positioning elements 120, 130, according to the above example the first positioning element 120, lies on an inner side of the edge R1, and the other positioning element 130 lies on an outer side of the edge. The positioning element 130 lying on the inner side allows the second exhibition stand frame to be arranged on the stacking element in simple manner. In this way exhibition stand frame S2 can be positioned on the stacking element in simple manner.

The skilled person will appreciate on the basis of the above description that the invention can be embodied in different ways and on the basis of different principles. The invention is not limited here to the above described embodiments. The above described embodiments and the figures are purely illustrative and serve only to increase understanding of the invention. The invention will not therefore be limited to the embodiments described herein, but is defined in the claims.

The invention claimed is:

1. A stacking element configured for arranging between two or more exhibition stand frames for facilitating stacking of the two or more exhibition stand frames, the stacking element comprising:

- a base with a first surface and a second surface, which is opposite the first surface, the first surface including a first positioning element thereon, which extends from the first surface in a first direction, the second surface including a second positioning element thereon, which extends from the second surface in a second direction;
- wherein the first and second positioning elements comprise flat wall members;
- wherein the exhibition stand frames are formed by at least four exhibition stand frame profiles, which together form a frame defining an exhibition stand panel plane;
- wherein the at least four exhibition stand frame profiles each have a side wall, which is bounded by an upright edge standing upright relative to the exhibition stand panel plane;
- wherein one of the first positioning element and the second positioning element is provided to strike against an inner side of the upright edge of a first of the exhibition stand frames when the stacking element is arranged on a first exhibition stand frame of the two or more exhibition stand frames; and
- wherein the other of the first positioning element and the second positioning element is provided to extend over the upright edge, on an outer side of the upright edge of the second exhibition stand frame when a second exhibition stand frame of the two or more exhibition stand frames is stacked on top of the first exhibition stand frame;
- wherein the base is triangular, as seen in a direction perpendicularly of one of the first surface and the second surface, the triangular base comprising a first angle side, a second angle side, and a third angle side; and
- wherein the first positioning element is configured to selectively engage both a corner of a single exhibition stand frame and a joint between two neighboring exhibition stand frames, wherein:
  - to engage the corner, the first positioning element comprises a first positioning element portion and a second positioning element portion arranged adjacently of, respectively, the first angle side and the second angle side to strike against intersecting upright edges of the single exhibition stand frame; and
  - to engage the joint between the two neighboring exhibition stand frames, a first recess is provided between the first positioning element portion and the second positioning element portion at an intersection between the first angle side and the second angle side, the first recess being configured to receive and accommodate the upright edges of the two neighboring exhibition stand frames lying against each other.

2. The stacking element according to claim 1, wherein the triangular base is in a form of a right triangle and the first positioning element and the second positioning element are provided close to one of the sides of the triangular base.

3. The stacking element according to claim 1, wherein the first positioning element lies adjacently of one of the sides and extends over at least a portion of a length of the one of the sides.

4. The stacking element according to claim 1, further comprising at least one third positioning element, which extends from the first surface in the first direction, wherein the at least one third positioning element extends parallel to the first positioning element and is located at a distance from the first positioning element.

5. The stacking element according to claim 4, wherein the at least one third positioning element is at least two third positioning elements, which extend parallel to respectively the first positioning element portion and the second positioning element portion, respectively.

6. The stacking element according to claim 5, wherein:

a first recess is provided between the first positioning element portion and the second positioning element portion, the first recess being provided at a position of an intersection between two connecting sides of the triangular base; and a second recess is provided between two of the third positioning elements and wherein the second recess is aligned with the first recess.

7. The stacking element according to claim 6, wherein the second recess has a dimension greater than a width of the upright edge of the exhibition stand frame profile.

8. The stacking element according to claim 4, wherein the second positioning element comprises a first positioning element portion and a second positioning element portion, which are respectively provided on the first side and the second side of the triangular base connecting thereto.

9. The stacking element according to claim 8, wherein another recess is provided between the first positioning element portion of the second positioning element and the second positioning element portion of the second positioning element, which another recess is provided at a position of an intersection between the two connecting sides.

10. The stacking element according to claim 9, further comprising a further additional positioning element, which extends from the second surface in the second direction, wherein the further additional positioning element lies parallel to and at a distance from the third side, between the first side and the second side.

11. The stacking element according to claim 10, wherein the further additional positioning element is provided with a further recess, which is aligned with the another recess.

12. The stacking element according to claim 1, wherein the first recess has a dimension greater than a width of the upright edge of an associated exhibition stand frame profile.

13. The stacking element according to claim 1, further comprising an additional positioning element, which extends from the first surface in the first direction, wherein the additional positioning element lies adjacently of and parallel to the third side, between the first side and the second side.

14. The stacking element according to claim 13, wherein the first recess has a dimension greater than a width of the upright edge of an exhibition stand profile and wherein the additional positioning element is provided with an additional recess, which is aligned with the first recess.

15. The stacking element according to claim 1, wherein the second positioning element is provided at a distance from one of the angle sides and extends over at least a portion of the length of the respective side.

16. The stacking element according to claim 15, wherein the distance between the one side and the second positioning element substantially corresponds with a width of the upright edge of one of the exhibition stand profiles.

17. The stacking element according to claim 1, wherein the stacking element is integrally formed.

* * * * *